United States Patent [19]

Markfelder et al.

[11] 4,153,309
[45] May 8, 1979

[54] SHOULDERLESS ROLLER BEARING

[75] Inventors: Günter Markfelder; Heinrich Hofmann, both of Schweinfurt, Fed. Rep. of Germany

[73] Assignee: Kugelfischer Georg Schäfer & Co., Schweinfurt, Fed. Rep. of Germany

[21] Appl. No.: 845,905

[22] Filed: Oct. 27, 1977

[30] Foreign Application Priority Data

Oct. 28, 1976 [DE] Fed. Rep. of Germany ....... 2648985

[51] Int. Cl.² ............................................ F16C 33/46
[52] U.S. Cl. .................................. 308/217; 308/174; 308/201; 308/213
[58] Field of Search .................. 308/174, 201, 207 R, 308/212, 213, 214, 216, 217, 218; 29/148.4 C, 148.4 R, 148.4 A

[56] References Cited

U.S. PATENT DOCUMENTS 3,416,848 12/1968 Recknagel ............................ 308/174
3,975,066 8/1976 Hofmann et al. ..................... 308/217

FOREIGN PATENT DOCUMENTS 2441121 3/1976 Fed. Rep. of Germany ........... 308/217
2449194 4/1976 Fed. Rep. of Germany ........... 308/201
2308013 11/1976 France ..................................... 308/201

Primary Examiner—Charles E. Frankfort
Attorney, Agent, or Firm—Karl F. Ross

[57] ABSTRACT

A cage for the rollers of a journal bearing, held between two shoulderless track surfaces at least one of which is formed by a ring, has an annular flange resiliently engaging in a peripheral V-groove of the ring which is axially offset from the roller-holding cage pockets. The flange has an end face formed with an annular incision designed to make it radially compressible, that incision lying at or just beyond one of the radial limits of the gap formed between the two track surfaces. The axially outer boundary of the V-groove is recessed with reference to the associated track surface.

8 Claims, 5 Drawing Figures

SHOULDERLESS ROLLER BEARING

Field of the Invention

Our present invention relates to a journal bearing of the type wherein a set of rotary bodies, specifically rollers, are held between two coaxial cylindrical track surfaces forming part of a pair of relatively rotatable members, such as an outer ring and a shaft or an inner ring carried on the latter.

BACKGROUND OF THE INVENTION

Rollers or other rotary bodies of a journal bearing are generally held in pockets of one or more annular cages bracketed by shoulders which are designed to prevent or limit any axial excursion thereof. The presence of such shoulders, however, makes a precise machining of the roller tracks difficult. It has, therefore, already been proposed (see, for example, German Pat. No. 1,056,881) to use shoulderless track surfaces and to fit the roller cages with extensions engageable in grooves of the track surfaces for axial guidance.

OBJECT OF THE INVENTION

The object of our present invention is to provide a particularly simple construction of this type, providing positive axial guidance for one or more cages of a journal bearing.

SUMMARY OF THE INVENTION

We realize this object, in accordance with our present invention, by providing at least one of the relatively rotatable members with one or two annular peripheral grooves on its track surface, each groove being bounded by an end zone of that member which is radially recessed with respect to a central portion of the track surface to facilitate the introduction of an annular flange of a respective bearing cage into the groove, the cage consisting of an elastic material (e.g. a synthetic resin) so that its flange can be snap-fitted into the mating groove. Such interfitting is further facilitated by the provision of an annular incision on an outer transverse face of the flange confronting the aforementioned end zone, that incision being centered on the axis of the track surfaces and being radially offset from the gap formed between these surfaces, i.e. lying at or somewhat beyond the radial limit of the gap defined by the corresponding track surface.

According to a more particular feature of our invention, each groove flange has a V-profile with a longer inclined flank and a shorter radial flank, the latter terminating at an edge formed by the adjacent end zone of the track surface.

BRIEF DESCRIPTION OF THE DRAWING

The above and other features of our invention will now be described in detail with reference to the accompanying drawing in which.

SPECIFIC DESCRIPTION

Figure 1:
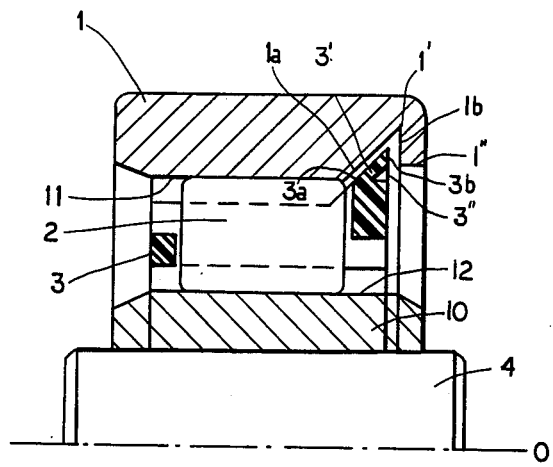
FIG. 1 is an axial sectional view of half a journal bearing according to our invention, comprising a single row of rollers.

In FIG. 1 we have shown a shaft 4 centered on an axis 0 and surrounded by a pair of coaxial rings, i.e. an outer ring 1 and an inner ring 10, these rings forming a pair of cylindrical track surfaces 11 and 12 defining an annular gap between them. Within that gap there are disposed a multiplicity of bearing rollers 2 (only one shown) rotatably seated in pockets of an annular cage 3 which maintains their peripheral spacing and also holds them in a predetermined axial position. To this end the cage 23 is integrally formed with an internal annular flange 3' snap-fitted into an annular retaining groove 1' of track surface 11, the flange 3' and the groove 1' having mating V-profiles with long inclined flanks 1a, 3a and short radial flanks 1b, 3b. The radial flank 3b of flange 3' is part of a transverse face formed with an annular incision 3" centered on axis 0. This incision has a triangular cross-section diverging toward the face 3b, with one side extending axially and the other sloping substantially parallel to flanks 1a and 3a. The axially extending side of incision 3" is shown to have the same radius as the central portion of track surface 11 so as to be flush therewith. Groove 1' is externally bounded by an annular end zone 1" which is recessed with reference to that central portion to facilitate the insertion of flange 3'; the radial height of incision 3" lets the flange collapse sufficiently to clear the boundary 1" during that insertion but not to let the flange 3' contract to the extent necessary for entry into the gap between track surfaces 11 and 12. Thus, rollers 2 are effectively held in their axial position by this one flange.

The arrangement of FIG. 1 can also be used without the ring 10, the rollers 2 then bearing directly upon the shaft 4.

Figure 2:
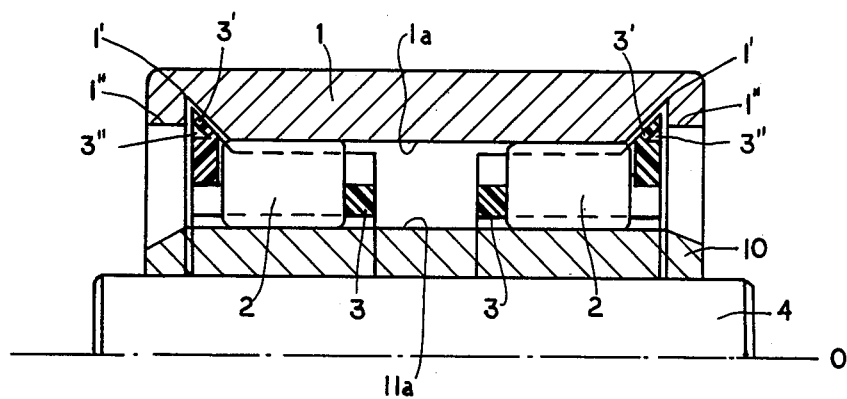
FIG. 2 is a view similar to FIG. 1 but showing a bearing with two rows of rollers.

In FIG. 2 the rollers 2 have been divided into two parallel rows with duplication of cages 3 having flanges 3' received in respective retaining grooves 1' with recessed outer boundaries 1".

Figure 3:
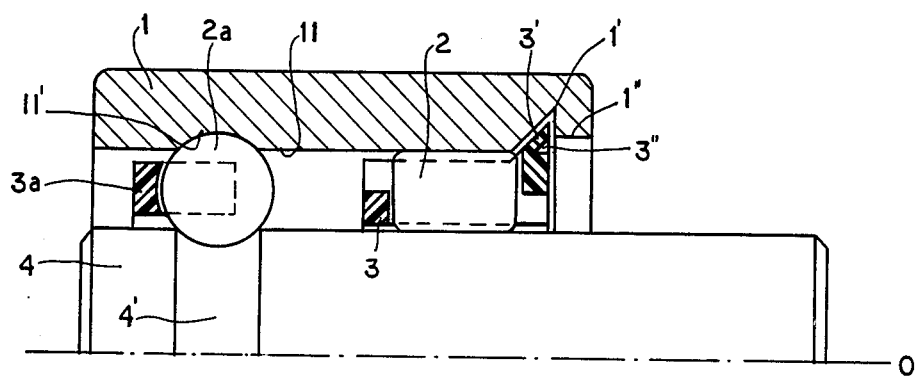
FIGS. 3 and 4 are axial sectional views of bearings differing from those of FIGS. 1 and 2 by the provision of bearing balls in addition to the rollers.

The assembly of FIG. 3 differs from that of FIG. 1 by the provision of two shallow guide grooves 11' and 4' on track surface 11 of ring 1 and on the confronting track surface of shaft 4. These guide grooves accommodate a set of bearing balls 2a which are held in a cage 3a and serve to maintain the axial alignment of ring 1 with shaft 4.

Figure 4:
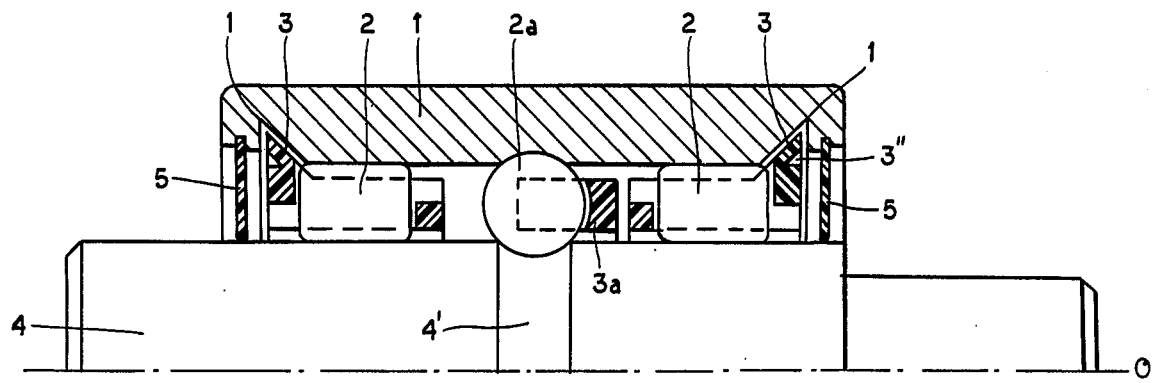

In FIG. 4, which illustrates a bearing for a water pump or the like, rollers 2 and cages 3 are symmetrically duplicated on opposite sides on the row of balls 2a. End disks 5 on ring 1, riding loosely on shaft 4, prevent the entrance of dust or dirt.

Figure 5:
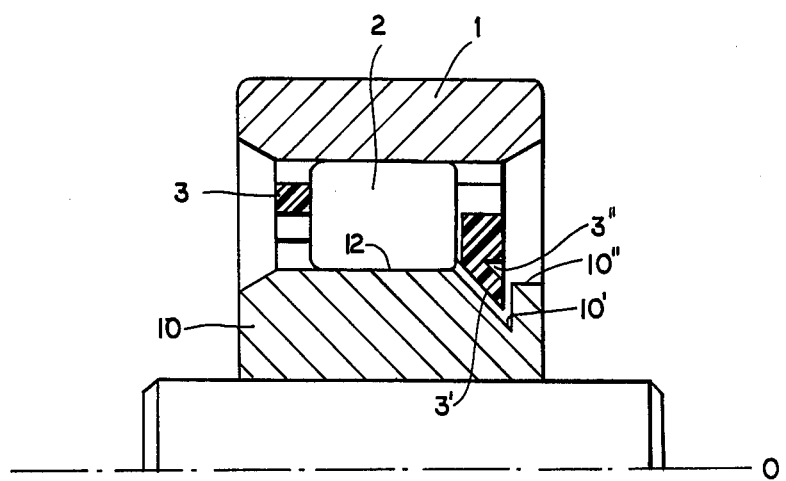
FIG. 5 is another view similar to FIG. 1 illustrating a modified arrangement.

In FIG. 5, finally, we have shown a reversal of the arrangement of FIG. 1 with a flange 3' of cage 3 engaging a retaining groove 10' of inner ring 10, that groove being bounded by a recessed edge 10"; an annular incision 3" or flange 3' lies, as in the preceding Figures, between the radial levels of that recessed edge and the corresponding track surface (here ring surface 12) which is again flush with the axially extending side of the triangular cross section of that incision. Thus, flange 3' cannot be radially expanded sufficiently to clear the track surface 12, thereby preventing significant excursion of rollers 2 in either axial direction.

Obviously, in a two-cage bearing as shown in FIG. 2 or 4 the cage flanges 3' could also engage in retaining grooves provided in inner ring 10 or shaft 4; if desired, one such groove may be formed in the outer ring 1 while the other is provided in the inner ring or the shaft.

A particularly advantageous feature of our invention is the fact that the recessed end zones 1" or 10" need not be trued in the machining of the corresponding track surfaces, with a resulting saving of work and expenses.

We claim:

1. In a journal bearing comprising two relatively rotatable members with coaxial cylindrical track surfaces separated by an annular gap, a set of rotary bodies in said gap engaging said track surfaces, and annular cage means of elastic material in said gap formed with a plurality of pockets containing said bodies, said track surfaces being free from shoulders projecting into said gap, the improvement wherein at least one of said members is provided with at least one annular peripheral retaining groove on its track surface, said retaining groove being bounded by a lateral end zone of said one of said members, said lateral end zone being radially recessed with respect to a central portion of the last-mentioned track surface engaged by said bodies, said cage means being provided with at least one annular flange snap-fitted into said retaining groove and axially offset from said pockets, said flange having an outer transverse face confronting said end zone, said transverse face being formed with an annular incision centered on the axis of said track surfaces and radially offset from said gap for increasing the resiliency of said flange to facilitate the insertion of said cage means into said gap and said flange into said retaining groove while preventing an axial displacement of said flange beyond said retaining groove.

2. The improvement defined in claim 1 wherein said bodies are rollers.

3. The improvement defined in claim 2 wherein said rollers form two rows, said cage means comprising two separate and axially spaced cages for said rows each having an annular flange snap-fitted into an annular peripheral retaining groove of said member bounded by a respective end zone which is radially recessed with respect to said central portion.

4. The improvement defined in claim 1 wherein said retaining groove and said flange each have a V-profile with a longer inclined flank and a shorter radial flank terminating at an edge formed by said end zone.

5. The improvement defined in claim 4 wherein said incision has a triangular cross-section diverging toward said transverse face.

6. The improvement defined in claim 5 wherein said triangular cross-section has a substantially axially extending side and a sloping side substantially paralleling said inclined flank.

7. The improvement defined in claim 6 wherein said axially extending side is substantially flush with said last-mentioned track surface.

8. The improvement defined in claim 1 wherein said track surfaces are formed with aligned annular guide grooves, further comprising a set of bearing balls seated in said guide grooves alongside said rotary bodies for maintaining a predetermined relative axial position of said members, said bearing balls being provided with a separate cage axially spaced from said cage means.

* * * * *